(12) United States Patent
Chuang et al.

(10) Patent No.: US 11,719,940 B2
(45) Date of Patent: Aug. 8, 2023

(54) HEAD-MOUNTED DISPLAY DEVICE

(71) Applicant: Coretronic Corporation, Hsin-Chu (TW)

(72) Inventors: Fu-Ming Chuang, Hsin-Chu (TW); Hsin-Hsiang Lo, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 17/752,857

(22) Filed: May 25, 2022

(65) Prior Publication Data
US 2022/0397764 A1    Dec. 15, 2022

(30) Foreign Application Priority Data

Jun. 15, 2021  (CN) .......................... 202110658634.6

(51) Int. Cl.
| | | |
|---|---|---|
| *G02B 27/01* | (2006.01) | |
| *G02B 5/10* | (2006.01) | |
| *G02B 26/08* | (2006.01) | |
| *G02B 26/10* | (2006.01) | |
| *G03B 5/06* | (2021.01) | |

(52) U.S. Cl.
CPC .......... *G02B 27/0172* (2013.01); *G02B 5/10* (2013.01); *G02B 26/0833* (2013.01); *G02B 26/0883* (2013.01); *G02B 26/101* (2013.01); *G03B 5/06* (2013.01); *G02B 2027/0174* (2013.01)

(58) Field of Classification Search
CPC ........ G02B 27/0172; G02B 5/10; G02B 5/06; G02B 26/0833; G02B 26/0883; G02B 26/101; G02B 2027/0174
See application file for complete search history.

(56) References Cited

U.S. PATENT DOCUMENTS

| | | |
|---|---|---|
| 8,817,379 B2 | 8/2014 | Saeedi et al. |
| 10,409,082 B2 | 9/2019 | Kilcher et al. |
| | (Continued) | |

FOREIGN PATENT DOCUMENTS

| | | | |
|---|---|---|---|
| CN | 106662310 A | * 5/2017 | .............. B60Q 1/14 |
| CN | 110297324 | 10/2019 | |
| | (Continued) | | |

OTHER PUBLICATIONS

"Search Report of Europe Counterpart Application", dated Nov. 2, 2022, pp. 1-9.

*Primary Examiner* — Stephen G Sherman
(74) *Attorney, Agent, or Firm* — JCIPRNET

(57) ABSTRACT

A head-mounted display device including a projection device and an optical waveguide is provided. The projection device has an optical pupil located on a second surface of the optical waveguide, and includes a light source, a first MEMS mirror element, a second MEMS mirror element, and a relay optical element group. The relay optical element group has a first axis equivalent focal length corresponding to a first parallel light beam and has a second axis equivalent focal length corresponding to a second parallel light beam. The first parallel light beam and the second parallel light beam travel along an optical axis of the relay optical element group, and a value of the first axis equivalent focal length is different from a value of the second axis equivalent focal length. The head-mounted display device may provide good image quality and a large field of view.

12 Claims, 12 Drawing Sheets

(56) References Cited

U.S. PATENT DOCUMENTS

| | | |
|---|---|---|
| 2011/0134017 A1 | 6/2011 | Burke |
| 2012/0307328 A1 | 12/2012 | Kessler |
| 2013/0222919 A1* | 8/2013 | Komatsu ............ G02B 27/0172 |
| | | 359/630 |
| 2018/0130391 A1 | 5/2018 | Bohn |
| 2019/0278076 A1 | 9/2019 | Chen et al. |
| 2020/0096615 A1* | 3/2020 | Upton .................... G02B 26/10 |
| 2021/0109343 A1 | 4/2021 | Gao et al. |

FOREIGN PATENT DOCUMENTS

| | | |
|---|---|---|
| TW | 579172 | 3/2004 |
| TW | 202034023 | 9/2020 |
| WO | 2018043625 | 3/2018 |
| WO | 2020183229 | 9/2020 |
| WO | 2020203285 | 10/2020 |

* cited by examiner

HEAD-MOUNTED DISPLAY DEVICE

CROSS-REFERENCE TO RELATED APPLICATION

This application claims the priority benefit of China application serial no. 202110658634.6, filed on Jun. 15, 2021. The entirety of the above-mentioned patent application is hereby incorporated by reference herein and made a part of this specification.

BACKGROUND

Technical Field

The invention relates to a head-mounted display device.

Description of Related Art

A main structure of a laser beam scanning (LBS) device is that after a laser light source emits laser light, the laser light is scanned and projected to a screen through a two-dimensional MEMS mirror to produce a two-dimensional image. In a technical field of applying the LBS device to virtual reality of a head-mounted display device, there is a currently known structure in which a HOE (holographic optical element) diffractive element is attached to a glasses lens, and an optical engine mechanism of the LBS device is placed on a glasses frame. In this way, when the laser light scans the HOE diffractive element, it may be reflected to a pupil of a human eye to produce a virtual image.

However, since a currently known design adopts a two-dimensional MEMS mirror to perform scanning of two-dimensional directions at the same time, this two-dimensional MEMS mirror is a MEMS biaxial scanning mirror. A scanning frequency and a scanning angle of such MEMS mirror have upper limits, which may cause disadvantages such as an image dragging phenomenon, a small field of view, etc.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a head-mounted display device, which is adapted to provide good image quality and a large field of view.

Other objects and advantages of the invention may be further illustrated by the technical features broadly embodied and described as follows.

In order to achieve one or a portion of or all of the objects or other objects, an embodiment of the invention provides a head-mounted display device. The head-mounted display device includes a projection device and an optical waveguide. The projection device has an optical pupil, and includes a light source, a first MEMS mirror element, a second MEMS mirror element, and a relay optical element group. The light source is configured to provide a light beam. The first MEMS mirror element is located on a transmission path of the light beam. The second MEMS mirror element is located on the transmission path of the light beam, wherein the first MEMS mirror element is located between the second MEMS mirror element and the light source. The relay optical element group is located on the transmission path of the light beam and between the second MEMS mirror element and the optical pupil. The relay optical element group has a first axis equivalent focal length corresponding to a first parallel light beam on a first reference plane and has a second axis equivalent focal length corresponding to a second parallel light beam on a second reference plane. The first parallel light beam and the second parallel light beam travel along an optical axis of the relay optical element group, and the optical axis is located on the first reference plane and the second reference plane at the same time, the first reference plane and the second reference plane are orthogonal to each other, and a value of the first axis equivalent focal length is different from a value of the second axis equivalent focal length. The optical waveguide is located on the transmission path of the light beam and has a first surface and a second surface opposite to each other, wherein the first surface is located between the relay optical element group and the second surface. The optical pupil is located on the second surface.

Based on the above description, the embodiments of the invention have at least one of following advantages or effects. In the embodiment of the invention, when the light beam is transmitted to the optical pupil of the projection device of the head-mounted display device through the first MEMS mirror element, the second MEMS mirror element, and the relay optical element group, the light beam is coupled into the optical waveguide of the head-mounted display device, and is transmitted to the human eye through the optical waveguide for imaging. In addition, since the projection device of the head-mounted display device respectively controls scanning and imaging of the light beam in a first direction and a second direction through vibration of the first MEMS mirror element and the second MEMS mirror element, a scanning angle and a scanning frequency of the first MEMS mirror element and the second MEMS mirror element may be controlled to appropriately increase the scanning angle and the scanning frequency, thereby reducing an image drag phenomenon and increasing a range of the field of view. Moreover, since the projection device of the head-mounted display device is respectively matched to the optical pupil in the first direction and the second direction through the vibration of the first MEMS mirror element and the second MEMS mirror element, the light beam may be converged on the optical pupil, therefore, through a design of optical parameters of the relay optical element group, a range of the light beam entering the optical pupil may fill a size of the optical pupil.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
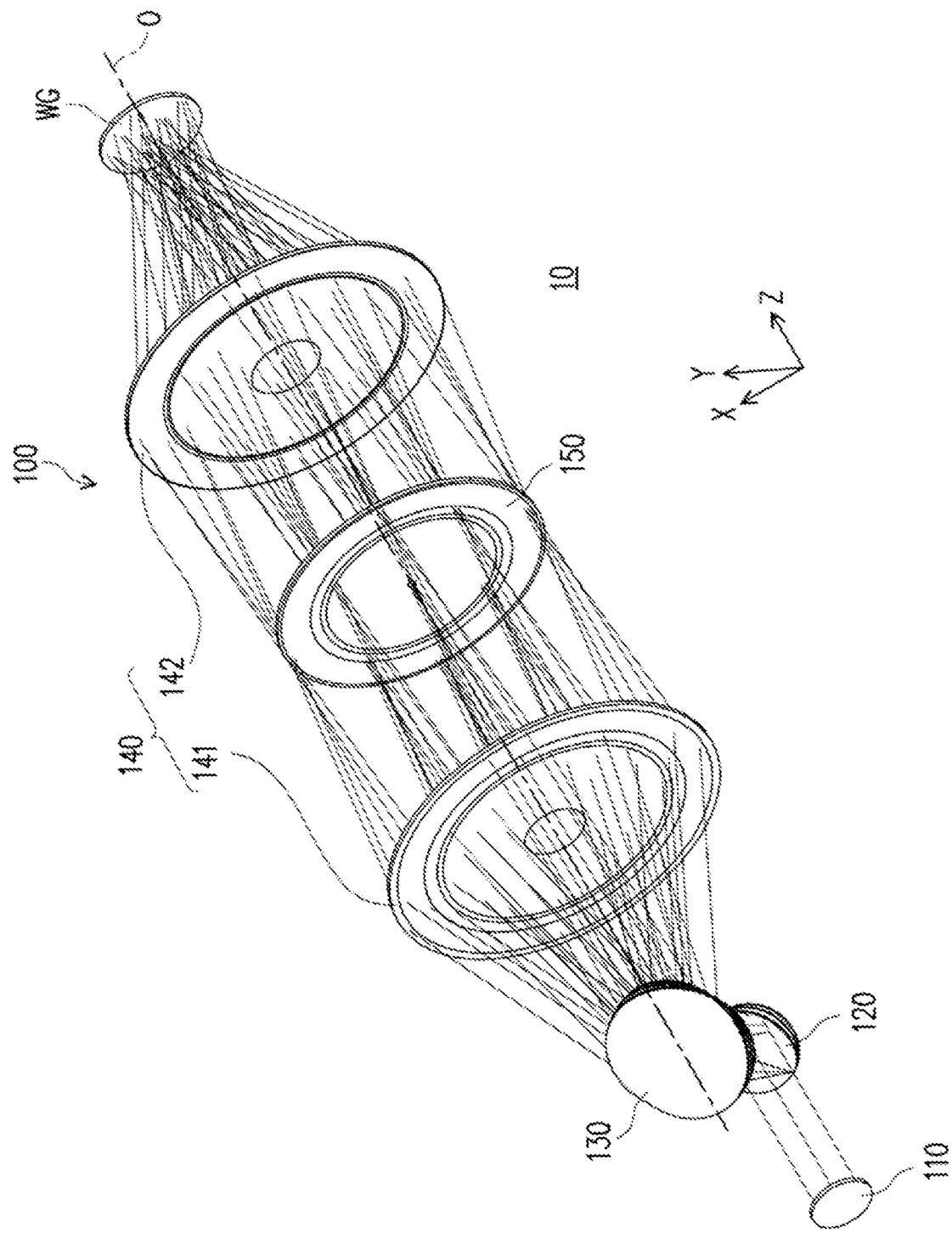
FIG. 1A is a partial schematic perspective view of a head-mounted display device according to an embodiment of the invention.
Figure 1B:
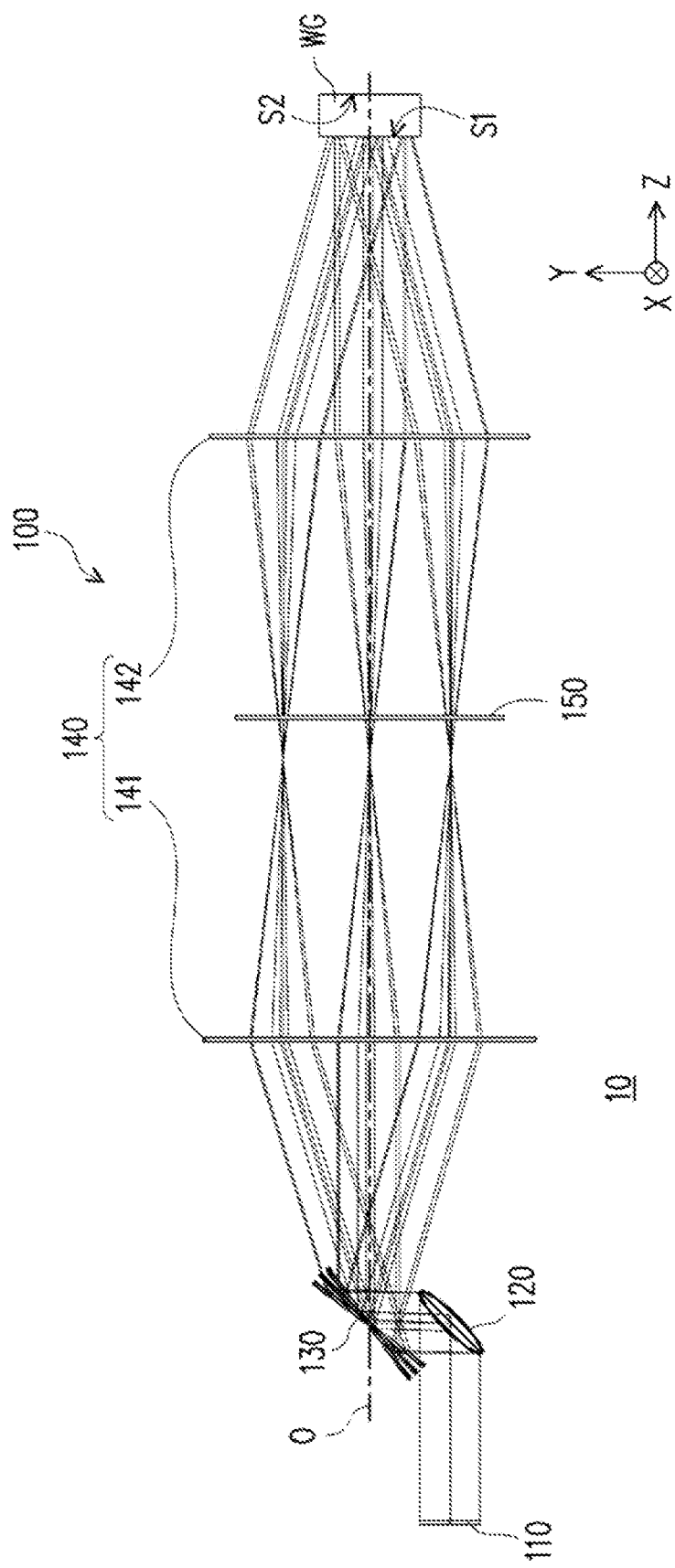
FIG. 1B is a schematic side view of the head-mounted display device of FIG. 1A.

FIG. 1A is a partial schematic perspective view of a head-mounted display device according to an embodiment of the invention. FIG. 1B is a schematic side view of the head-mounted display device of FIG. 1A. Referring to FIG. 1A and FIG. 1B, in the embodiment, a head-mounted display device 10 includes a projection device 100 and an optical waveguide WG. Furthermore, the projection device 100 is used as a display device of the head-mounted display device 10, and the head-mounted display device 10 is configured in front of at least one eye of a user. The projection device 100 has an optical pupil, where the optical pupil of the projection device 100 is an entrance pupil of the optical waveguide WG.

To be specific, as shown in FIG. 1A and FIG. 1B, the projection device 100 includes a light source 110, a first MEMS mirror element 120, a second MEMS mirror element 130 and a relay optical element group 140. The light source 110 is used to provide a light beam. The light source 110 is, for example, a collimated laser source for providing a collimated laser beam. The first MEMS mirror element 120, the second MEMS mirror element 130, and the relay optical element group 140 are located on a transmission path of the light beam. The first MEMS mirror element 120 is located between the second MEMS mirror element 130 and the light source 110. The relay optical element group 140 is located between the second MEMS mirror element 130 and the optical pupil (i.e., the optical waveguide WG). In addition, the optical waveguide WG is located on the transmission path of the light beam and has a first surface S1 and a second surface S2 opposite to each other, where the first surface S1 is located between the relay optical element group 140 and the second surface S2, and optical pupil of the projection device 100 is located on the second surface S2 of the optical waveguide WG. It should be noted that the optical pupil in the embodiment refers to a position where the light beam itself is reduced to a minimum range, and does not refer to a physical optical element used to limit the range of the light beam.

In the embodiment, the first MEMS mirror element 120 swings at a first vibrating angle, so that the light beam is matched with the optical pupil in a first direction through the relay optical element group 140, and the second MEMS mirror element 130 swings at a second vibrating angle, so that the light beam is matched with the optical pupil in a second direction through the relay optical element group 140. For example, in the embodiment, the first direction is, for example, an X-axis direction, and the second direction is, for example, a Y-axis direction.

In the embodiment, there is a space between the first MEMS mirror element 120 and the second MEMS mirror element 130 in the second direction. Moreover, the first vibrating angle is greater than the second vibrating angle, and an area of the first MEMS mirror element 120 is smaller than an area of the second MEMS mirror element 130. A contour of the first MEMS mirror element 120 is substantially a circle, and a diameter thereof is about 1 mm, and the first vibrating angle is substantially ±12°. A contour of the second MEMS mirror element 130 is substantially an ellipse, and long and short axes thereof are respectively about 2 mm and 1 mm, and the second vibrating angle thereof is about ±9°.

In the optical path of the light beam, since the light beams passing through the first MEMS mirror element 120 and the second MEMS mirror element 130 must be respectively scanned to the optical pupil (i.e., the entrance pupil of the optical waveguide WG, which is located on the second surface S2 of the optical waveguide WG) for size matching, when a diameter of the optical pupil is 3 mm, it means that magnifications required by the light beams passing through the first MEMS mirror element 120 and the second MEMS mirror element 130 are not the same, and the relay optical element group 140 is required to respectively adjust the magnifications corresponding to the first direction and the second direction. For example, taking the above data as an example, the magnification of the relay optical element group 140 in the first direction is 3, and the magnification in the second direction is 1.341, so that the light beams passing through the first MEMS mirror element and the second MEMS mirror element 130 may be respectively matched with the optical pupil in the first direction and the second direction.

In the embodiment, the relay optical element group 140 has a first axis equivalent focal length corresponding to a first parallel light beam on a first reference plane and has a second axis equivalent focal length corresponding to a second parallel light beam on a second reference plane. To be specific, the first parallel light beam and the second parallel light beam are virtual light beams traveling along an optical axis O of the relay optical element group 140. In the embodiment, the optical axis O is located on the first reference plane and the second reference plane at the same time, and the first reference plane and the second reference plane are orthogonal to each other. For example, in the embodiment, a direction of the optical axis O is, for example, a Z-axis direction, the first reference plane is, for example, an XZ plane, and the second reference plane is, for example, a YZ plane. Therefore, the first direction (X-axis direction) may be orthogonal to the optical axis O on the first reference plane, and the second direction (Y-axis direction) may also be orthogonal to the optical axis O on the second reference plane.

Moreover, since the light beam transmitted through the vibration of the first MEMS mirror element 120 may be matched with the optical pupil in the first direction through the relay optical element group 140, and the light beam transmitted through the vibration of the second MEMS mirror element 130 may be matched with the optical pupil in the second direction through the relay optical element group 140, a value of the first axis equivalent focal length is equal to an equivalent focal length of the relay optical element group 140 when imaging the light beam passing through the relay optical element group 140 in the first direction, and a value of the second axis equivalent focal length is equal to an equivalent focal length of the relay optical element group 140 when imaging the light beam passing through the relay optical element group 140 in the second direction. In the embodiment, the value of the first axis equivalent focal length is different to the value of the second axis equivalent focal length. Namely, the relay optical element group 140 is an asymmetric imaging lens assembly.

Further, as shown in FIG. 1A and FIG. 1B, in the embodiment, the relay optical element group 140 includes a first relay optical element 141 and a second relay optical element 142, where the first relay optical element 141 has a first focal length corresponding to the first parallel light beam, and has a second focal length corresponding to the second parallel light beam, and the second relay optical element 142 has a third focal length corresponding to the first parallel light beam, and has a fourth focal length corresponding to the second parallel light beam, and the first focal length, the second focal length, the third focal length and the fourth focal length satisfy:

$$f_{2x}/f_{1x} \leq f_{2y}/f_{1y}$$

Where, $f_{1x}$ is the first focal length, $f_{1y}$ is the second focal length, $f_{2x}$ is the third focal length, and $f_{2y}$ is the fourth focal length. In this way, through the design of the optical parameters of the relay optical element group 140, the light beams passing through the first MEMS mirror element 120 and the second MEMS mirror element 130 may be respectively matched with the optical pupil in the first direction and the second direction. In addition, an intermediate image 150 is formed between the first relay optical element 141 and the second relay optical element 142 included in the relay optical element group 140.

In this way, when the light beam is transmitted to the optical pupil of the projection device 100 of the head-mounted display device 10 through the first MEMS mirror element 120, the second MEMS mirror element 130 and the relay optical element group 140, the light beam may be coupled into the optical waveguide WG of the head-mounted display device 10, and is transmitted to a human eye through the optical waveguide WG for imaging. Moreover, since the projection device 100 of the head-mounted display device 10 respectively controls the scanning and imaging of the light beams in the first direction and the second direction through the vibration of the first MEMS mirror element 120 and the second MEMS mirror element 130, the scanning angles and scanning frequencies of the first MEMS mirror element 120 and the second MEMS mirror element 130 may be controlled to appropriately increase the scanning angles and scanning frequencies, thereby reducing the image dragging phenomenon and improving a range of the field of view. In addition, since the projection device 100 of the head-mounted display device 10 respectively match the optical pupil in the first direction and the second direction through the vibration of the first MEMS mirror element 120 and the second MEMS mirror element 130, the light beam may be converged on the optical pupil, by designing optical parameters of the relay optical element group 140, a range of the light beam entering the optical pupil may fill a size of the optical pupil. In addition, as shown in FIG. 1B, in the embodiment, there is an optical path between the second relay optical element 142 and the optical pupil. In this way, the light beam may be further uniformized in this interval, thereby improving the uniformity of the light beam.

Figure 2A:
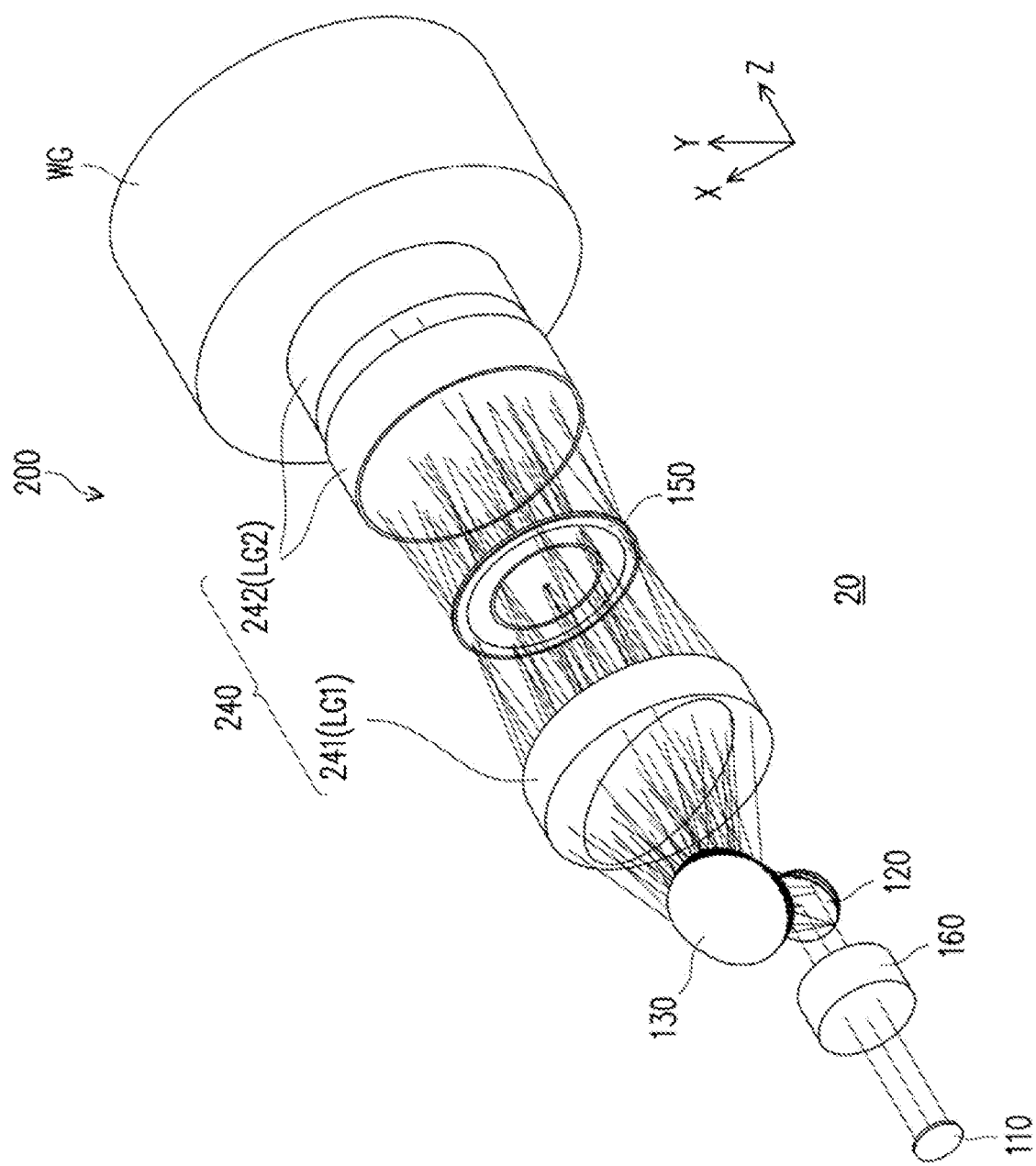
FIG. 2A is a partial schematic perspective view of a head-mounted display device according to another embodiment of the invention.
Figure 2B:
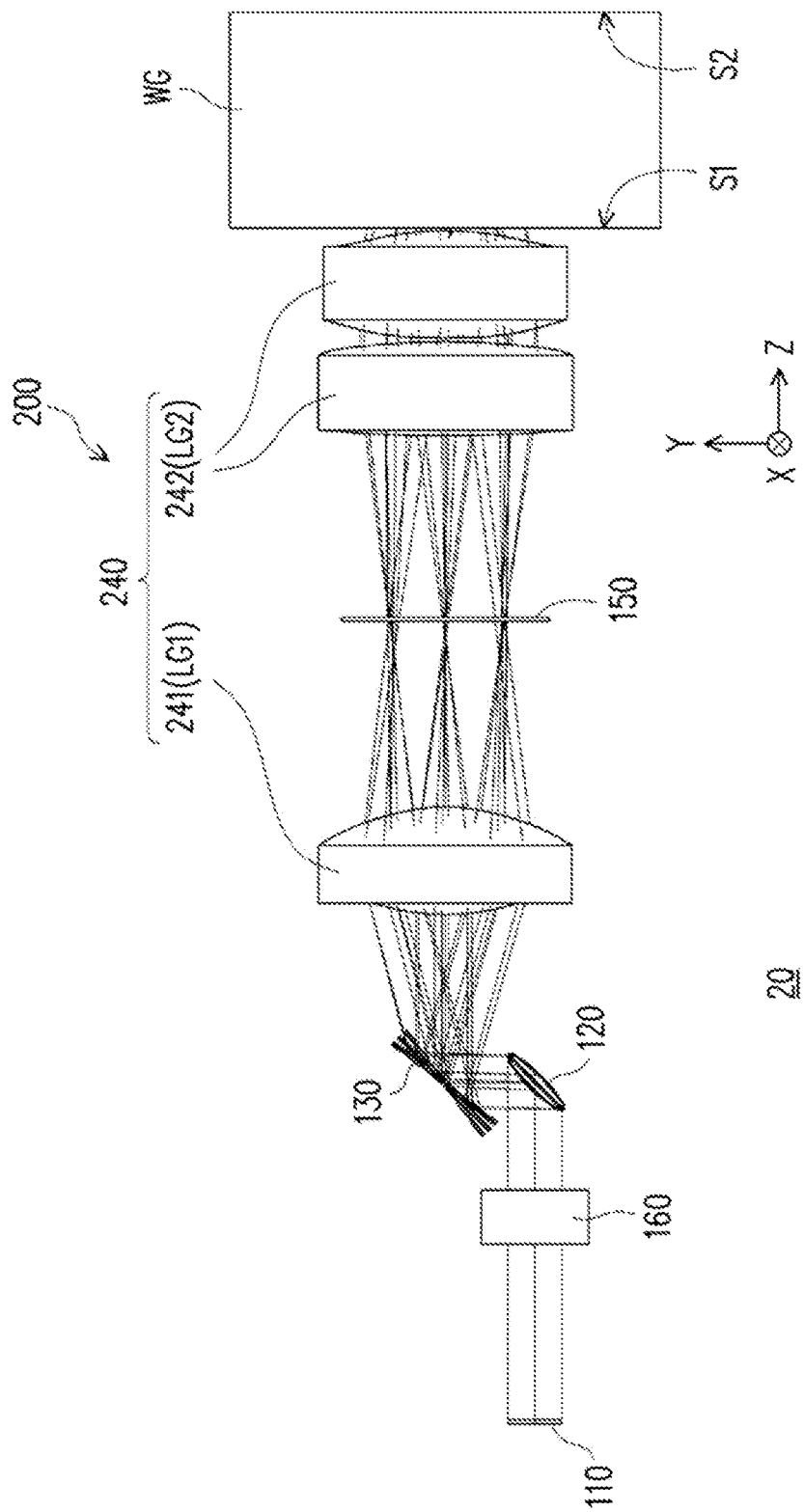
FIG. 2B is a schematic side view of the head-mounted display device of FIG. 2A.

FIG. 2A is a partial schematic perspective view of a head-mounted display device according to another embodiment of the invention. FIG. 2B is a schematic side view of the head-mounted display device of FIG. 2A. Referring to FIG. 2A and FIG. 2B, a head-mounted display device 20 of FIG. 2A and FIG. 2B and a projection device 200 contained therein are similar to the head-mounted display device 10 of FIG. 1A and FIG. 1B and the projection device 100 contained therein, and differences there between are as follows. As shown in FIG. 2A and FIG. 2B, in the embodiment, a first relay optical element 241 is a first lens group LG1, and a second relay optical element 242 is a second lens group LG2. Furthermore, the first lens group LG1 or the second lens group LG2 may be a symmetric lens element group or an asymmetric lens element group, and the projection device 200 may further include a collimator 160, which is located on the transmission path of the light beam, and located between the light source 110 and the first MEMS mirror element 120, so as to collimate the light beam provided by the light source 110 to facilitate guiding the light beam to the first MEMS mirror element 120, but the invention is not limited thereto. In addition, the intermediate image 150 is formed between the first relay optical element 241 and the second relay optical element 242 included in the relay optical element group 240.

In this way, due to the configuration of the first MEMS mirror element 120, the second MEMS mirror element 130, and the relay optical element group 240, when the light beam is transmitted to the optical pupil of the projection device 200 through the first MEMS mirror element 120, the second MEMS mirror element 130, and the relay optical element group 240, the light beam may be coupled into the optical waveguide WG, and is then transmitted to the human eye through the optical waveguide WG for imaging, so that the head-mounted display device 20 and the projection device 200 contained therein may also achieve similar effects and advantages as the aforementioned head-mounted display device 10 and the projection device 100 contained therein, and details thereof are not repeated.

Figure 3A:
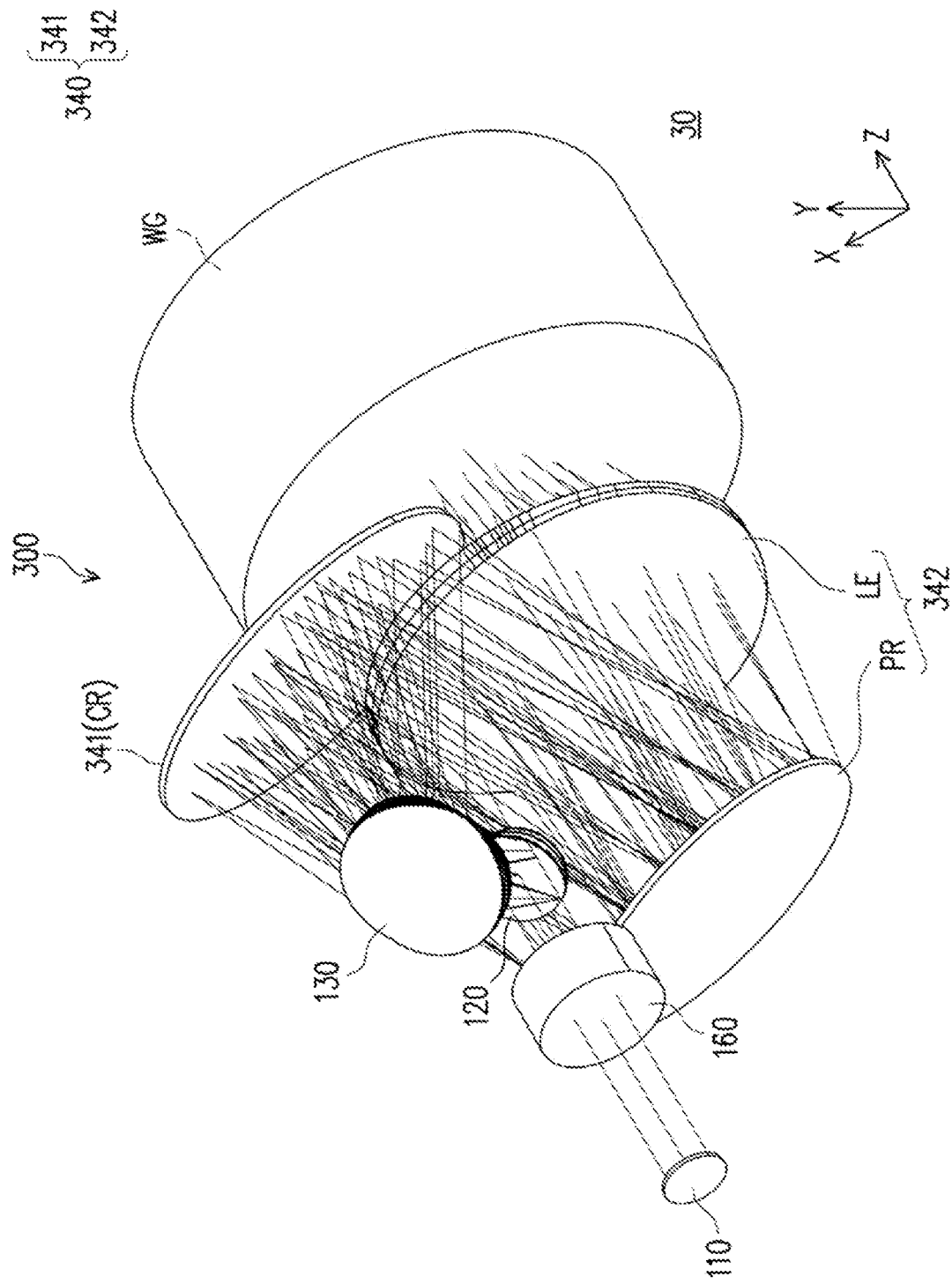
FIG. 3A is a partial schematic perspective view of a head-mounted display device according to still another embodiment of the invention.
Figure 3B:
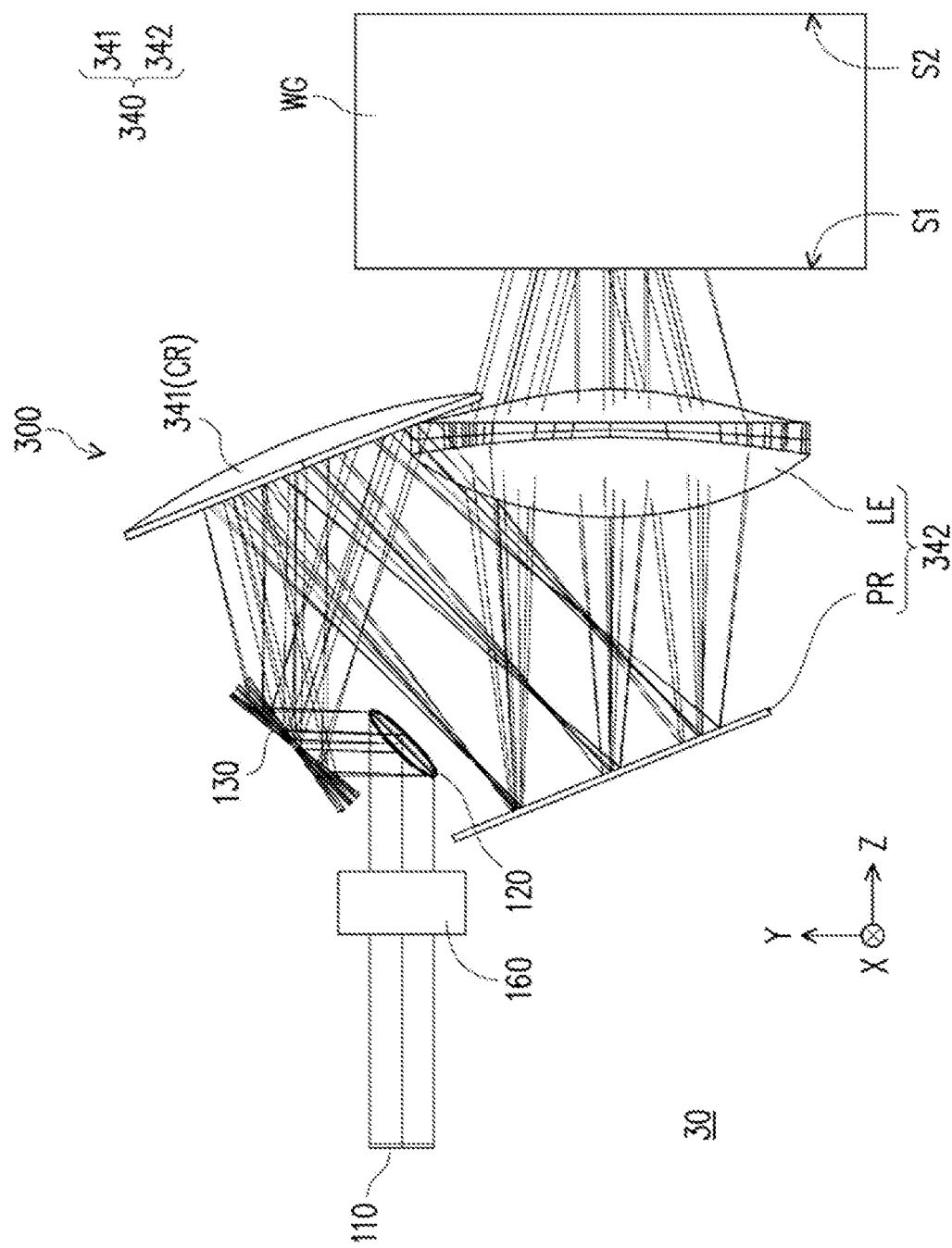
FIG. 3B is a schematic side view of the head-mounted display device of FIG. 3A.

FIG. 3A is a partial schematic perspective view of a head-mounted display device according to still another embodiment of the invention. FIG. 3B is a schematic side view of the head-mounted display device of FIG. 3A. Referring to FIG. 3A and FIG. 3B, a head-mounted display device 30 of FIG. 3A and FIG. 3B and a projection device 300 contained therein are similar to the head-mounted display device 10 of FIG. 1A and FIG. 1B and the projection device 100 contained therein, and differences there between are as follows. As shown in FIG. 3A and FIG. 3B, in the embodiment, a first relay optical element 341 is a curved reflector CR, a second relay optical element 342 includes a planar reflector PR and a lens element LE, and a reflecting surface of the curved reflector CR and a reflecting surface of the planar reflector PR face each other. The projection device 300 may further include the collimator 160. The collimator 160 is located on the transmission path of the light beam and located between the light source 110 and the first MEMS mirror element 120, so as to collimate the light beam provided by the light source 110 to facilitate guiding the light beam to the first MEMS mirror element 120.

Further, in the embodiment, surface contours of the curved reflector CR and the lens element LE may be symmetrical optical surfaces or asymmetrical optical surfaces, where the curved reflector CR is close to the first MEMS mirror element 120 and the second MEMS mirror element 130, and the lens element LE is close to the optical waveguide WG. Moreover, in the embodiment, the planar reflector PR is arranged in the middle of an optical path between the curved reflector CR and the lens element LE. In this way, the optical path may be deflected, thereby reducing a volume of an optical engine and improving imaging quality. In addition, an intermediate image (not shown in the figure) may be formed between the optical elements included in the relay optical element group 340.

In this way, with the configuration of the first MEMS mirror element 120, the second MEMS mirror element 130, and the relay optical element group 340, when the light beam is transmitted to the optical pupil of the projection device 300 through the first MEMS mirror element 120, the second MEMS mirror element 130, and the relay optical element group 340, the light beam may be coupled into the optical waveguide WG, and is then transmitted to the human eye through the optical waveguide WG for imaging, so that the head-mounted display device 30 and the projection device 300 included therein may also achieve similar effects and advantages as the aforementioned head-mounted display device 10 and the projection device 100 contained therein, and details thereof are not repeated.

Figure 4A:
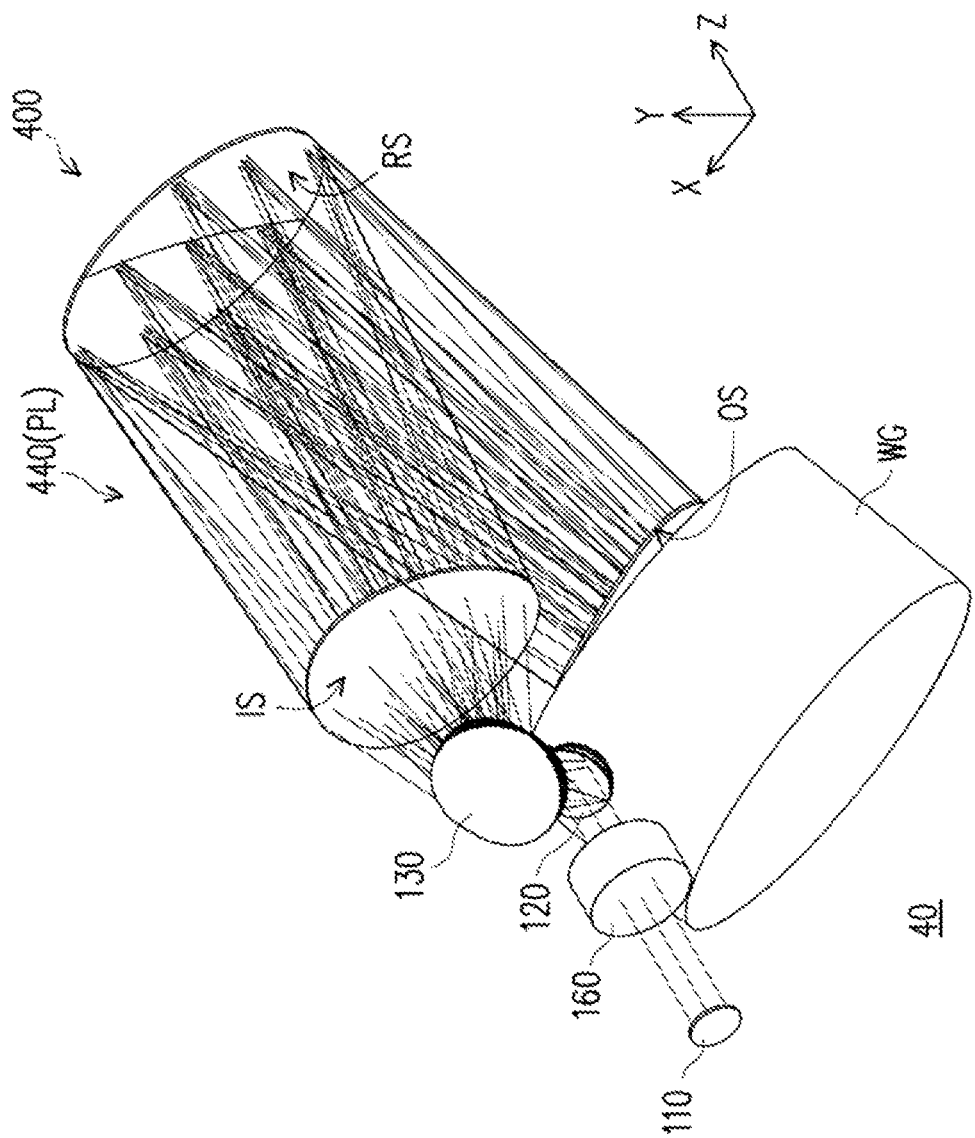
FIG. 4A is a partial schematic perspective view of a head-mounted display device according to still another embodiment of the invention.
Figure 4B:
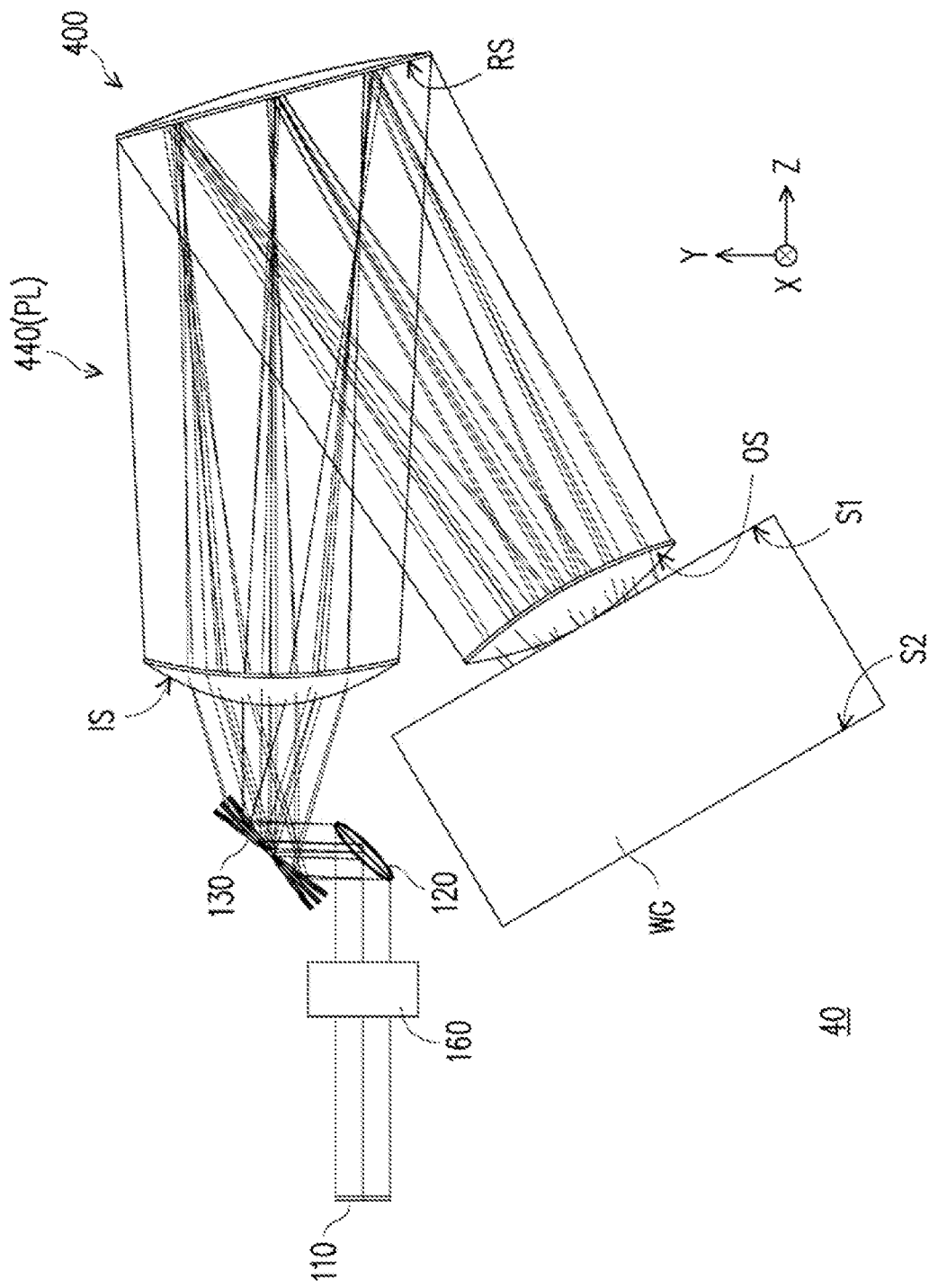
FIG. 4B is a schematic side view of the head-mounted display device of FIG. 4A.

FIG. 4A is a partial schematic perspective view of a head-mounted display device according to still another embodiment of the invention. FIG. 4B is a schematic side view of the head-mounted display device of FIG. 4A. Referring to FIG. 4A and FIG. 4B, a head-mounted display device 40 of FIG. 4A and FIG. 4B and a projection device 400 contained therein are similar to the head-mounted display device 10 of FIG. 1A and FIG. 1B and the projection device 100 contained therein, and differences there between are as follows. As shown in FIG. 4A and FIG. 4B, in the embodiment, a relay optical element group 440 is a prism system PL. The prism system PL is an integrally formed prism element, and has an incident curved surface IS, a reflective optical surface RS, and a light-emitting curved surface OS. Contours of the above-mentioned optical surfaces may be symmetrical or asymmetrical optical surfaces. Based on the above configuration of the optical surfaces, the light beam may be converged on the optical pupil. The projection device 400 may further include a collimator 160. The collimator 160 is located on the transmission path of the light beam and between the light source 110 and the first MEMS mirror element 120, so as to collimate the light beam provided by the light source 110 to facilitate guiding the light beam to the first MEMS mirror element 120. In addition, an intermediate image (not shown) is formed between the optical elements included in the relay optical element group 440.

In this way, with the configuration of the first MEMS mirror element 120, the second MEMS mirror element 130, and the relay optical element group 440, when the light beam is transmitted to the optical pupil of the projection device 400 through the first MEMS mirror element 120, the second MEMS mirror element 130, and the relay optical element group 440, the light beam may be coupled into the optical waveguide WG, and is then transmitted to the human eye through the optical waveguide WG for imaging, so that the head-mounted display device 40 and the projection device 400 included therein may also achieve similar effects and advantages as the aforementioned head-mounted display device 10 and the projection device 100 contained therein, and details thereof are not repeated.

Figure 5A:
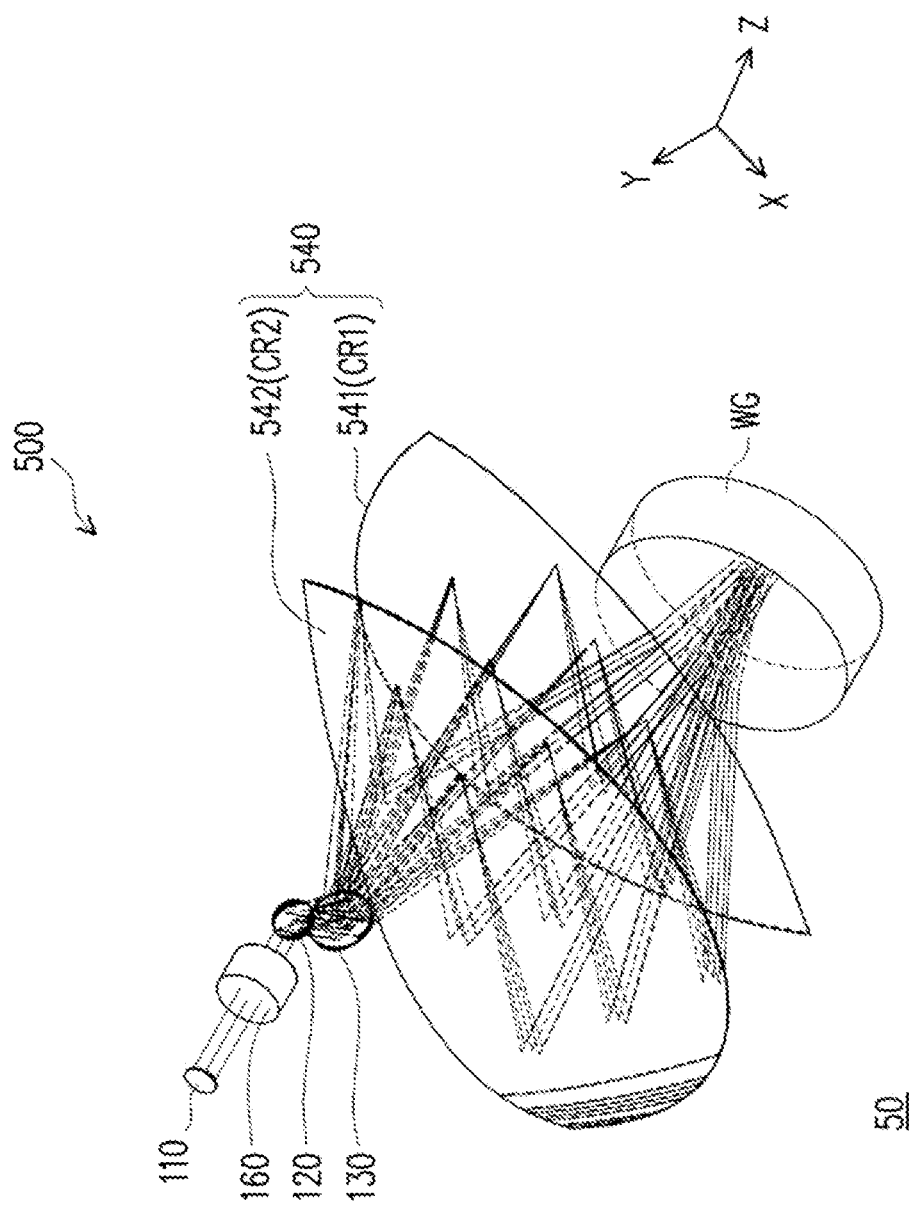
FIG. 5A is a partial schematic perspective view of a partial three-dimensional structure of a head-mounted display device according to still another embodiment of the invention.
Figure 5B:
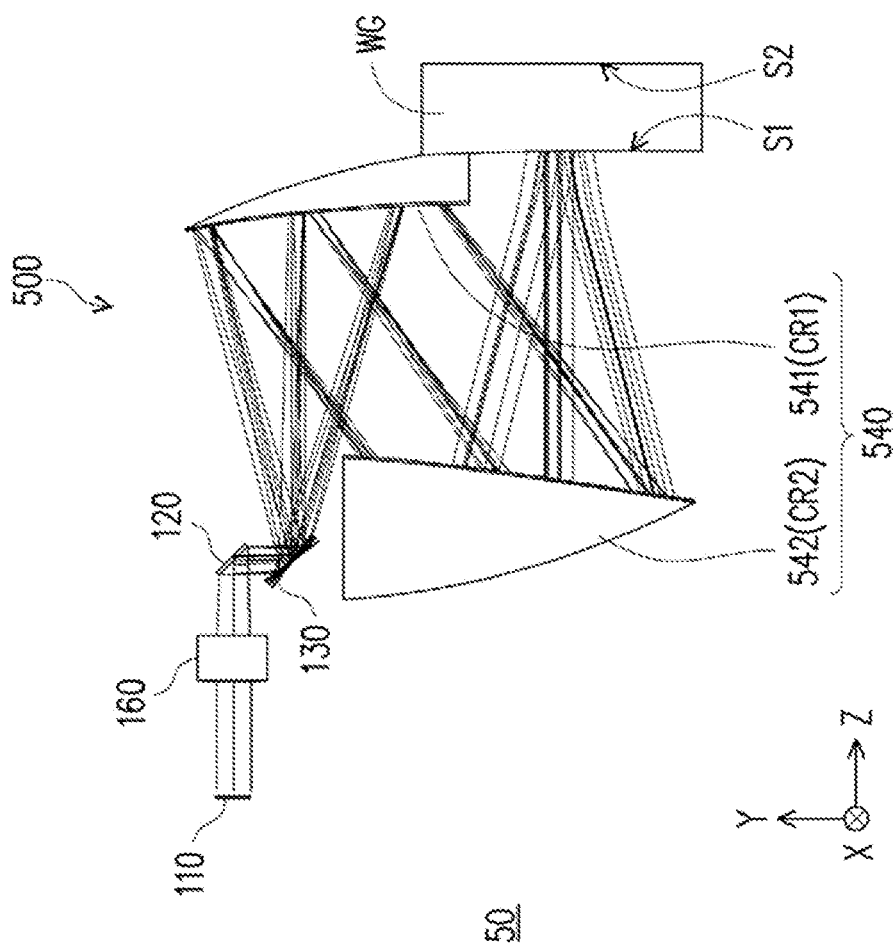
FIG. 5B is a schematic side view of the head-mounted display device of FIG. 5A.

FIG. 5A is a partial schematic perspective view of a partial three-dimensional structure of a head-mounted display device according to still another embodiment of the invention. FIG. 5B is a schematic side view of the head-mounted display device of FIG. 5A. Referring to FIG. 5A and FIG. 5B, a head-mounted display device 50 of FIG. 5A and FIG. 5B and a projection device 500 contained therein are similar to the head-mounted display device 10 of FIG. 1A and FIG. 1B and the projection device 100 contained therein, and differences there between are as follows. As shown in FIG. 5A and FIG. 5B, in the embodiment, a first relay optical element 541 is a first curved reflector CR1, a second relay optical element 542 is a second curved reflector CR2, where a reflecting surface of the first curved reflector CR1 and a reflecting surface of the second curved reflector CR2 face each other, and contours of the reflecting surfaces of the first curved reflector CR1 and the second curved reflector CR2 may also be symmetrical or asymmetrical. The projection device 500 may further include a collimator 160, where the collimator 160 is located on the transmission path of the light beam and between the light source 110 and the first MEMS mirror element 120, so as to collimate the light beam provided by the light source 110 to facilitate guiding the light beam to the first MEMS mirror element 120. In the embodiment, the second curved reflector CR2 is close to the first MEMS mirror element 120 and the second MEMS mirror element 130, and the first curved reflector CR1 is close to the optical waveguide WG, but on the optical path of the light beam, the light beam may first reach the first curved reflector CR1 and then reach the second curved reflector CR2. Furthermore, the light beam provided by the light source 110 passes through the collimator 160 and is then transmitted to the first MEMS mirror element 120 and the second MEMS mirror element 130, and then the light beam is transmitted to the first curved reflector CR1 and is then reflected to the second curved reflector CR2, and then the light beam is reflected by the second curved reflector CR2 and transmitted to the optical waveguide WG. In addition, an intermediate image (not shown in the figure) may be formed between the optical elements included in the relay optical element group 540.

In this way, with the configuration of the first MEMS mirror element 120, the second MEMS mirror element 130, and the relay optical element group 540, when the light beam is transmitted to the optical pupil of the projection device 500 through the first MEMS mirror element 120, the second MEMS mirror element 130, and the relay optical element group 540, the light beam may be coupled into the optical waveguide WG, and is then transmitted to the human eye through the optical waveguide WG for imaging, so that the head-mounted display device 50 and the projection device 500 included therein may also achieve similar effects and advantages as the aforementioned head-mounted display device 10 and the projection device 100 contained therein, and details thereof are not repeated.

Figure 6A:
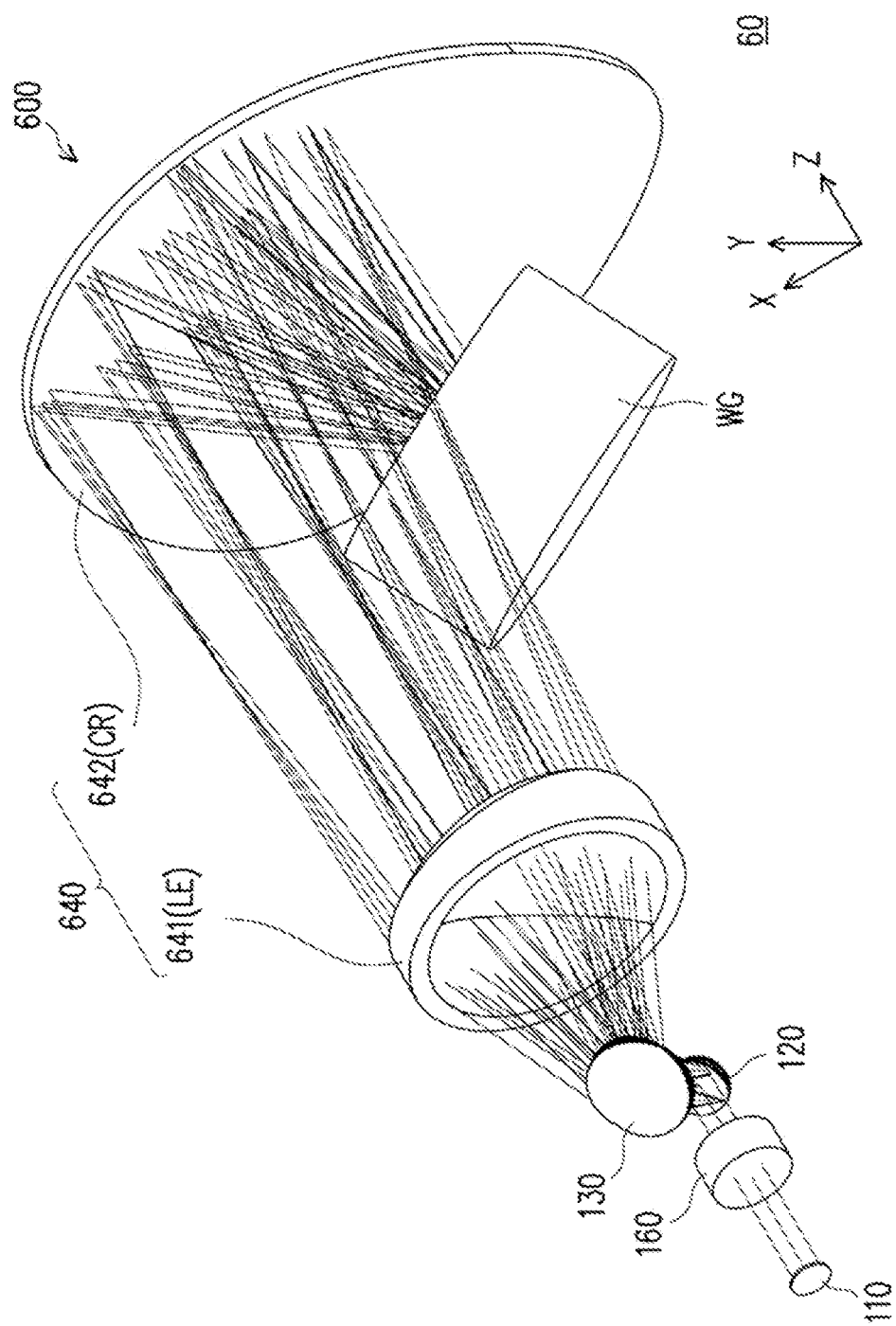
FIG. 6A is a schematic view of a partial three-dimensional structure of a head-mounted display device according to still another embodiment of the invention.
Figure 6B:
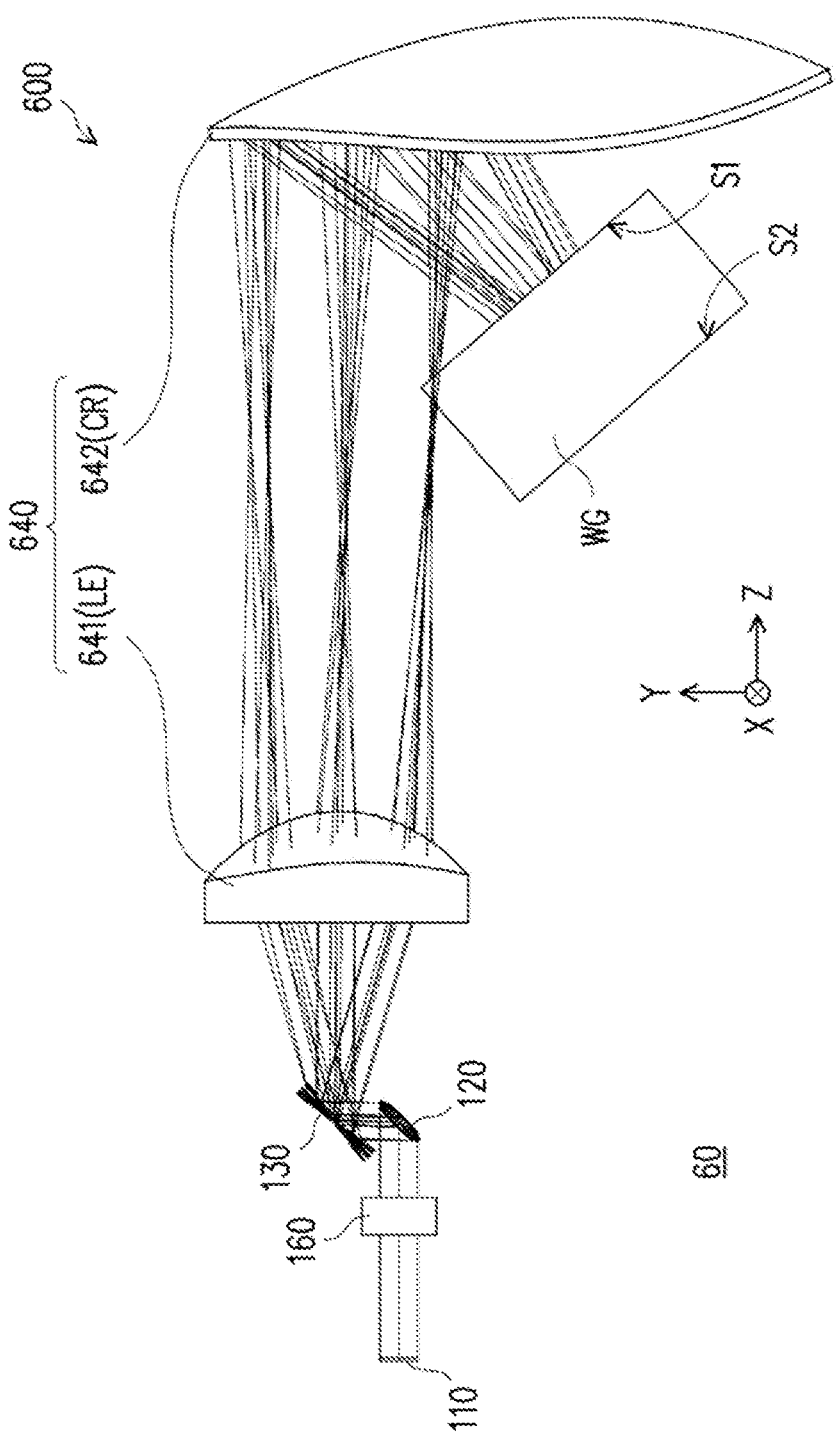
FIG. 6B is a schematic side view of the head-mounted display device of FIG. 6A.

FIG. 6A is a schematic view of a partial three-dimensional structure of a head-mounted display device according to still another embodiment of the invention. FIG. 6B is a schematic side view of the head-mounted display device of FIG. 6A. Referring to FIG. 6A and FIG. 6B, a head-mounted display device 60 of FIG. 6A and FIG. 6B and a projection device 600 contained therein are similar to the head-mounted display device 10 of FIG. 1A and FIG. 1B and the projection device 100 contained therein, and differences there between are as follows. As shown in FIG. 6A and FIG. 6B, in the embodiment, a first relay optical element 641 is a lens element LE, and a second relay optical element 642 is a curved reflector CR. In the embodiment, surface contours of the curved reflector CR and the lens element LE may be symmetrical optical surfaces or asymmetrical optical surfaces. The lens element LE is close to the first MEMS mirror element 120 and the second MEMS mirror element 130, and the curved reflector CR is close to the optical waveguide WG. The projection device 600 may further include a collimator 160, where the collimator 160 is located on the transmission path of the light beam and between the light source 110 and the first MEMS mirror element 120, so as to collimate the light beam provided by the light source 110 to facilitate guiding the light beam to the first MEMS mirror element 120. In addition, an intermediate image (not shown in the figure) may be formed between the optical elements included in the relay optical element group 640.

In this way, with the configuration of the first MEMS mirror element 120, the second MEMS mirror element 130, and the relay optical element group 640, when the light beam is transmitted to the optical pupil of the projection device 600 through the first MEMS mirror element 120, the second MEMS mirror element 130, and the relay optical element group 640, the light beam may be coupled into the optical waveguide WG, and is then transmitted to the human eye through the optical waveguide WG for imaging, so that the head-mounted display device 60 and the projection device 600 included therein may also achieve similar effects and advantages as the aforementioned head-mounted display device 10 and the projection device 100 contained therein, and details thereof are not repeated.

In summary, the embodiments of the invention have at least one of following advantages or effects. In the embodiment of the invention, when the light beam is transmitted to the optical pupil of the projection device of the head-mounted display device through the first MEMS mirror element, the second MEMS mirror element, and the relay optical element group, the light beam is coupled into the optical waveguide of the head-mounted display device, and is transmitted to the human eye through the optical waveguide for imaging. In addition, since the projection device of the head-mounted display device respectively controls scanning and imaging of the light beam in a first direction and a second direction through vibration of the first MEMS mirror element and the second MEMS mirror element, a scanning angle and a scanning frequency of the first MEMS mirror element and the second MEMS mirror element may be controlled to appropriately increase the scanning angle and the scanning frequency, thereby reducing an image drag phenomenon and increasing a range of the field of view. Moreover, since the projection device of the head-mounted display device is respectively matched to the optical pupil in the first direction and the second direction through the vibration of the first MEMS mirror element and the second MEMS mirror element, the light beam may be converged on the optical pupil, therefore, through a design of optical parameters of the relay optical element group, a range of the light beam entering the optical pupil may fill a size of the optical pupil.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A head-mounted display device, comprising a projection device and an optical waveguide, wherein
the projection device has an optical pupil, and comprises a light source, a first MEMS mirror element, a second MEMS mirror element, and a relay optical element group, wherein
the light source is configured to provide a light beam;
the first MEMS mirror element is located on a transmission path of the light beam;
the second MEMS mirror element is located on the transmission path of the light beam, wherein the first MEMS mirror element is located between the second MEMS mirror element and the light source, and the second MEMS mirror element directly receives the light beam reflected from the first MEMS mirror element; and
the relay optical element group is located on the transmission path of the light beam and between the second MEMS mirror element and the optical pupil, wherein the relay optical element group has a first axis equivalent focal length corresponding to a first parallel light beam on a first reference plane and has a second axis equivalent focal length corresponding to a second parallel light beam on a second reference plane, the first parallel light beam and the second parallel light beam travel along an optical axis of the relay optical element group, and the optical axis is located on the first reference plane and the second reference plane at the same time, the first reference plane and the second reference plane are orthogonal to each other, and a value of the first axis equivalent focal length is different from a value of the second axis equivalent focal length; and
the optical waveguide is located on the transmission path of the light beam and has a first surface and a second surface opposite to each other, wherein the first surface is located between the relay optical element group and the second surface, and the optical pupil is located on the second surface.

2. The head-mounted display device as claimed in claim 1, wherein the first MEMS mirror element swings at a first vibrating angle, so that the light beam is matched with the optical pupil in a first direction through the relay optical element group, and the second MEMS mirror element swings at a second vibrating angle, so that the light beam is matched with the optical pupil in a second direction through the relay optical element group, and the first vibrating angle is greater than the second vibrating angle.

3. The head-mounted display device as claimed in claim 2, wherein there is a space between the first MEMS mirror element and the second MEMS mirror element in the second direction.

4. The head-mounted display device as claimed in claim 1, wherein an area of the first MEMS mirror element is smaller than an area of the second MEMS mirror element.

5. The head-mounted display device as claimed in claim 1, wherein the relay optical element group comprises a first relay optical element and a second relay optical element, and the first relay optical element has a first focal length corresponding to the first parallel light beam, and has a second focal length corresponding to the second parallel light beam, and the second relay optical element has a third focal length corresponding to the first parallel light beam, and has a fourth focal length corresponding to the second parallel light beam, and the first focal length, the second focal length, the third focal length and the fourth focal length satisfy:

$$f_{2x}/f_{1x} \le f_{2y}/f_{1y}$$

wherein, $f_{1x}$ is the first focal length, $f_{1y}$ is the second focal length, $f_{2x}$ is the third focal length, and $f_{2y}$ is the fourth focal length.

6. The head-mounted display device as claimed in claim 5, wherein there is an optical path between the second relay optical element and the optical pupil, so that the light beam is matched with the optical pupil through the relay optical element group.

7. The head-mounted display device as claimed in claim 5, wherein the first relay optical element is a first lens group, and the second relay optical element is a second lens group.

8. The head-mounted display device as claimed in claim 5, wherein the first relay optical element is a curved reflector, the second relay optical element comprises a planar reflector and a lens element, and a reflecting surface of the curved reflector and a reflecting surface of the planar reflector face each other.

9. The head-mounted display device as claimed in claim 5, wherein the first relay optical element is a first curved reflector, the second relay optical element is a second curved reflector, and a reflecting surface of the first curved reflector and a reflecting surface of the second curved reflector face each other.

10. The head-mounted display device as claimed in claim 5, wherein the first relay optical element is a lens element, and the second relay optical element is a curved reflector.

11. The head-mounted display device as claimed in claim 1, wherein the relay optical element group is a prism system, and the prism system has an incident curved surface, a reflective optical surface, and a light-emitting curved surface.

12. A head-mounted display device, comprising a projection device and an optical waveguide, wherein
the projection device has an optical pupil, and comprises a light source, a first MEMS mirror element, a second MEMS mirror element, and a relay optical element group, wherein
the light source is configured to provide a light beam;
the first MEMS mirror element is located on a transmission path of the light beam;
the second MEMS mirror element is located on the transmission path of the light beam, wherein the first MEMS mirror element is located between the second MEMS mirror element and the light source; and
the relay optical element group is located on the transmission path of the light beam and between the second MEMS mirror element and the optical pupil, wherein the relay optical element group has a first axis equivalent focal length corresponding to a first parallel light beam on a first reference plane and has a second axis equivalent focal length corresponding to a second parallel light beam on a second reference plane, the first parallel light beam and the second parallel light beam travel along an optical axis of the relay optical element group, and the optical axis is located on the first reference plane and the second reference plane at the same time, the first reference plane and the second reference plane are orthogonal to each other, and a value of the first axis equivalent focal length is different from a value of the second axis equivalent focal length, wherein the relay optical element group comprises a first relay optical element and a second relay optical element, and the first relay optical element has a first focal length corresponding to the first parallel light beam, and has a second focal length corresponding to the second parallel light beam, and the second relay optical element has a third focal length corresponding to the first parallel light beam, and has a fourth focal length corresponding to the second parallel light beam, and the first focal length, the second focal length, the third focal length and the fourth focal length satisfy:

$f_{2x}/f_{1x} \leq f_{2y}/f_{1y}$ wherein $f_{1x}$, is the first focal length, $f_{1y}$ is the second focal length, $f_{2x}$ is the third focal length, and $f_{2y}$ is the fourth focal length; and the optical waveguide is located on the transmission path of the light beam and has a first surface and a second surface opposite to each other, wherein the first surface is located between the relay optical element group and the second surface, and the optical pupil is located on the second surface.

* * * * *